G. W. BOYNTON.
Sheep Rack.
No. 54,285.  Patented May 1, 1866.
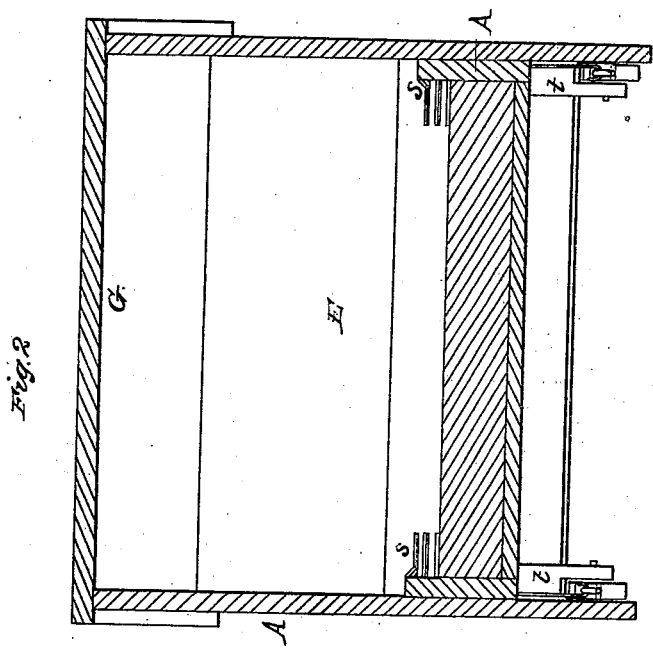
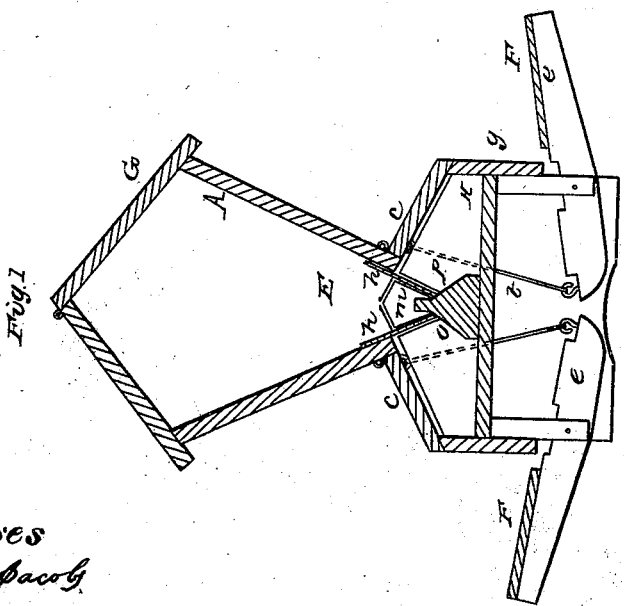
Witnesses
John P. Jacob
J. M. Mason
Inventor
George W. Boynton

UNITED STATES PATENT OFFICE.

GEORGE W. BOYNTON, OF AUBURN, NEW YORK.

IMPROVEMENT IN SHEEP-RACKS.

Specification forming part of Letters Patent No. 54,285, dated May 1, 1866.

*To all whom it may concern:*

Be it known that I, GEORGE W. BOYNTON, of Auburn, in the State of New York, have invented certain new and useful Improvements in Sheep-Feeders; and I hereby declare that the following is a true, full, and exact description of the same, reference being had to the accompanying drawings, and to the letters of reference marked thereon.

The nature of my invention consists in the application of certain mechanical devices in the construction of a sheep-feeder.

Figure 1 in the annexed drawings represents an end elevation of my sheep-feeder with the outside covering removed. Fig. 2 is a longitudinal vertical section of the same.

The letter A designates the body of the machine. The upper part of body A forms the bin E for holding grain, and the lower section constitutes the feeder or trough H from which the sheep obtain their food. The body A is widest where its sides meet the top G. From this point A tapers upward at its ends to receive the top G, and from the same point A tapers downward and receives the lid C.

One of the top pieces G is hinged to the other, which is fastened in its place permanently. The lid C is hinged at its inner edge to the side of A, and its outer edge is flush with the side *g* of the feeder H.

The object of the top G is to preserve the grain in the bin from injury.

Inside of the outer ends of *g* is securely fastened the boards *d*, (see Fig. 2,) which extend upward to the opening in the bottom of bin E. Through the center of this opening runs the longitudinal bar *m*, to the sides of which are fastened the boards O and P, the intention of this arrangement being to direct the grain from the bin E into the feeder H.

To regulate the quantity of grain that falls into the feeder H the two boards or slides *h* are provided. These slides move in grooves in boards *d*, and have narrow horizontal slots cut at each end for the purpose of receiving the metal latch *s*, which is pivoted on the top of boards *d*. By this arrangement the slides can be raised or lowered at pleasure.

On the inner sides of board *d* an opening is made for the insertion of rods *t*. The upper ends of these rods are hinged to the bottom of lid C, and the lower ends connected by a similar device to the inner ends of the bars *e* that support the platform F, which is placed immediately in front of feeder H.

The platform F will descend and the lid C be raised by the action of rod *t*. The moment the sheep ascend it they will have access to the food contained in feeder F. When the sheep leave the platform the lid will fall back to its original position, and thus secure the grain that may be left in the feeder H from damage from inclement weather.

It will be observed that there are two feeders, one on each side of body A, and the platforms of both are operated by the same devices. The bars *e*, upon which the platform rests, work on their respective pivots, which pass through a block fastened to the inner side of *g* and through the bars *e*.

Having thus described my invention, what I claim, and desire to secure by Letters Patent, is—

The combination of the bar *m*, the boards O and P, the slides *h*, the levers *e*, the rods *t*, and the lids C, the whole constructed and operating as and for the purpose herein specified.

GEORGE W. BOYNTON.

Witnesses:
DAVID H. BOYNTON,
HORACE T. COOK.